(12) United States Patent
Manabe et al.

(10) Patent No.: US 9,577,271 B2
(45) Date of Patent: *Feb. 21, 2017

(54) FUEL CELL SYSTEM AND ITS CONTROL METHOD

(71) Applicant: Toyota Jidosha Kabushiki Kaisha, Toyota-shi, Aichi-ken (JP)

(72) Inventors: Kota Manabe, Toyota (JP); Hiroyuki Imanishi, Toyota (JP); Tomoya Ogawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 91 days.

This patent is subject to a terminal disclaimer.

(21) Appl. No.: 14/480,971

(22) Filed: Sep. 9, 2014

(65) Prior Publication Data

US 2015/0064589 A1 Mar. 5, 2015

Related U.S. Application Data

(63) Continuation of application No. 12/670,849, filed as application No. PCT/JP2008/063624 on Jul. 23, 2008, now Pat. No. 8,859,157.

(30) Foreign Application Priority Data

Jul. 30, 2007 (JP) .................................. 2007-197057

(51) Int. Cl.
*H01M 8/04* (2016.01)
*H01M 16/00* (2006.01)
*H01M 8/10* (2016.01)

(52) U.S. Cl.
CPC ....... *H01M 8/04037* (2013.01); *H01M 8/0488* (2013.01); *H01M 8/0491* (2013.01);
(Continued)

(58) Field of Classification Search
CPC ............... H01M 8/04037; H01M 8/04873; H01M 8/04902; H01M 8/04731; H01M 8/04388; H01M 8/04395; H01M 8/04268; H01M 8/04559; H01M 8/04567; H01M 8/04589; H01M 8/04358; H01M 8/04365; H01M 8/0488; H01M 8/0491; H01M 16/006; H01M 8/04335; H01M 2008/1095; H01M 2250/20; H01M 8/04649; H01M 8/04492; Y02E 60/50; Y02T 90/32
See application file for complete search history.

(56) References Cited

U.S. PATENT DOCUMENTS 6,096,449 A 8/2000 Fuglevand et al.
7,393,602 B2 7/2008 Thompson et al.
(Continued)

FOREIGN PATENT DOCUMENTS

JP 06-260196 A 9/1994
JP 2000-048845 A 2/2000
(Continued)

OTHER PUBLICATIONS

Supplementary European Search Report issued May 30, 2012 in EP Application No. 08791856.1. (in parent case).
(Continued)

*Primary Examiner* — Jeffrey Wollschlager
(74) *Attorney, Agent, or Firm* — Andrews Kurth Kenyon LLP

(57) ABSTRACT

A fuel cell system includes; a fuel cell which generates electricity by using a fuel gas and an oxidant gas as reaction gases; current control means which controls current of a fuel cell; voltage control means which controls voltage of the fuel cell; and heat value control means which calculates a heat value required by the fuel cell system and decides a target current value of the current control means and a target
(Continued)

voltage value of the voltage control means so as to generate the calculated necessary heat amount, thereby controlling the heat value. Thus, it is possible to supply a heat required for the fuel cell system without increasing the size of the fuel cell system.

7 Claims, 7 Drawing Sheets

(52) U.S. Cl.
CPC ... *H01M 8/04268* (2013.01); *H01M 8/04335* (2013.01); *H01M 8/04358* (2013.01); *H01M 8/04365* (2013.01); *H01M 8/04388* (2013.01); *H01M 8/04395* (2013.01); *H01M 8/04559* (2013.01); *H01M 8/04567* (2013.01); *H01M 8/04589* (2013.01); *H01M 8/04731* (2013.01); *H01M 8/04873* (2013.01); *H01M 8/04902* (2013.01); *H01M 16/006* (2013.01); *H01M 8/04492* (2013.01); *H01M 8/04649* (2013.01); *H01M 2008/1095* (2013.01); *H01M 2250/20* (2013.01); *Y02E 60/50* (2013.01); *Y02T 90/32* (2013.01)

(56) References Cited

U.S. PATENT DOCUMENTS

| 7,767,354 | B2 | 8/2010 | Saito et al. |
| 7,939,213 | B2 | 5/2011 | Ishikawa et al. |
| 8,110,311 | B2 | 2/2012 | Manabe et al. |
| 2006/0141309 | A1 | 6/2006 | Miyata et al. |
| 2009/0130509 | A1 | 5/2009 | Manabe et al. |

FOREIGN PATENT DOCUMENTS

| JP | 2004-030979 | A | 1/2004 |
| JP | 2004-311229 | A | 11/2004 |
| JP | 2006-134674 | A | 5/2006 |
| JP | 2007-038952 | A | 2/2007 |
| JP | 2007-149595 | A | 6/2007 |
| WO | 2007/063783 | A1 | 6/2007 |

OTHER PUBLICATIONS

Office Action mailed on Jul. 13, 2012 in U.S. Appl. No. 12/670,849.
Final Office Action mailed on Nov. 29, 2012 in U.S. Appl. No. 12/670,849.
Office Action mailed on Jan. 8, 2014 in U.S. Appl. No. 12/670,849.
Notice of Allowance mailed on Jun. 9, 2014 in U.S. Appl. No. 12/670,849.

FUEL CELL SYSTEM AND ITS CONTROL METHOD

CROSS REFERENCE TO RELATED APPLICATIONS

This is a continuation of U.S. patent application Ser. No. 12/670,849, filed on 26 Jan. 2010, which is a 371 national phase application of PCT/JP2008/063624 filed 23 Jul. 2008, claiming priority to Japanese Patent Applications No. JP 2007-197057 filed 30 Jul. 2007, the contents of which are incorporated herein by reference.

TECHNICAL FIELD

The present invention relates to fuel cell system that supplies a necessary quantity of heat.

BACKGROUND ART

A fuel cell generates electric energy by causing a reaction between an oxidizing gas and a hydrogen gas serving as a fuel gas. A fuel cell system that is incorporated in an automobile or the like is controlled so as to convert chemical energy in hydrogen fed to the fuel cell (hereinafter called "hydrogen energy") into electric energy at high efficiency (hereinafter referred to as "high-efficiency power generation") during normal operations. Therefore, a fuel cell that performs high-efficiency power generation has a small proportion of conversion from the hydrogen energy to thermal energy, and shows a small quantity of heat generation.

As a consequence, a heat quantity necessary for warming up the fuel cell to a temperature suitable for electric power generation (in the vicinity of 80° C.) fails to be generated. Moreover, when the fuel cell system has a heating apparatus, the thermal energy produced from the fuel cell at the time of the high-efficiency power generation is small, and is insufficient for the heat source for heating. In view of this, a fuel cell system that aims at supplementing the deficient heat quantity has been under development.

A fuel cell that is caused to generate electric power at low efficiency by reducing the amount of air to be supplied is known as a conventional fuel cell system (for example, see Patent Document 1). This enables an increase in the heat generation quantity for warming up the fuel cell.

A conventional fuel cell system having a heating apparatus is provided with heating means for heating a cooling medium, and a heat exchanger for supplying the heat used for the heating for air-conditioning in a cooling medium circulation passage of the fuel cell, for the purpose of supplying a heat quantity necessary for heating (hereinafter referred to as a "heating heat quantity") (see, for example, Patent Documents 2 and 3). In the case where the heat generation quantity from the fuel cell is small, the deficient heat quantity is supplied by heating the cooling medium by means of the heating means.

Patent Document 1: JP-A-2004-30979
Patent Document 2: JP-A-2004-311229
Patent Document 3: JP-A-2007-38952

DISCLOSURE OF THE INVENTION

Problems that the Invention is to Solve

In the conventional fuel cell system disclosed in Patent Document 1, the current and voltage of the fuel cell are uniquely determined based on the current-output curve of the fuel cell and the output power required for the fuel cell. For this reason, that has been a problem that the supplied heat generation quantity tends to be insufficient or excessive relative to the necessary heat quantity that is necessary for the fuel cell system to perform warming up.

In the conventional fuel cell system as described in Patent Documents 2 and 3, it has been necessary to increase the heating amount by the heating means in order to supply the deficient heating heat quantity. As a consequence, the heating means has increased in size, and the fuel cell system has increased in size accordingly.

An object of the invention is to supply a heat quantity necessary for the fuel cell system without increasing the size of the fuel cell system.

Means for Solving the Problems

The invention provides a fuel cell system including: a fuel cell that generates electric power using a fuel gas and an oxidizing gas serving as reaction gases; current controlling means for controlling a current of the fuel cell; voltage controlling means for controlling a voltage of the fuel cell; and heat generation quantity controlling means for controlling a heat generation quantity, by calculating a necessary heat quantity that is necessary for the fuel cell system and determining a target current value of the current controlling means and a target voltage value of the voltage controlling means so as to generate heat in the calculated necessary heat quantity.

Preferably, the fuel cell system includes a heating apparatus that uses the heat generated by the fuel cell as a heat source, and the necessary heat quantity includes a heating heat quantity necessary for the heating apparatus that is operating.

Preferably, the necessary heat quantity includes a warm-up heat quantity necessary for warming up the fuel cell.

Preferably, the necessary heat quantity includes a temperature-maintaining heat quantity necessary for maintaining the temperature of the fuel cell system at a predetermined temperature.

Preferably, the controlling means performs control with low-efficiency power generation in which power generation efficiency is lower than that of high-efficiency power generation of the fuel cell.

Preferably, the voltage controlling means is a DC/DC converter, and the current controlling means is a reaction gas supplying means.

The invention also provides a fuel cell system including: a fuel cell that generates electric power using a fuel gas and an oxidizing gas serving as reaction gases; a secondary battery that is charged by output power of the fuel cell, or that discharges charged electric power; and voltage controlling means for controlling a voltage of the secondary battery, the fuel cell system characterized by including: controlling means for, by calculating a necessary heat quantity that is necessary for the fuel cell system and a required output power required therefor, and based on the calculated necessary heat quantity and required output power, controlling the fuel cell so as to operate in any of the following modes: a high-efficiency power generation mode in which the fuel cell is caused to generate power at high efficiency; a first low-efficiency power generation mode in which a lower limit voltage value is set at a first lower limit voltage value and power generation efficiency is lower than that of the high-efficiency power generation; and a second low-efficiency power generation mode in which the lower limit voltage value is a second lower limit voltage value that is less than the first lower limit voltage value.

The invention also provides a fuel cell system including: a fuel cell that generates electric power using a fuel gas and an oxidizing gas serving as reaction gases; and voltage controlling means for controlling a voltage of the fuel cell, the fuel cell system further including controlling means for controlling the fuel cell, based on a necessary heat quantity that is necessary for the fuel cell system and a required output power required therefor, so as to operate in any of the following modes: a high-efficiency power generation mode in which the fuel cell is caused to generate power at high efficiency; and a second low-efficiency power generation mode in which a lower limit voltage value is a second lower limit voltage value and power generation efficiency is lower than that of the high-efficiency power generation.

Preferably, the fuel cell system includes a heating apparatus that uses the heat generated by the fuel cell as a heat source, and the necessary heat quantity includes a heating heat quantity necessary for the heating apparatus that is operating.

Preferably, the necessary heat generation quantity includes a temperature-maintaining heat quantity necessary for maintaining the temperature of the fuel cell at a predetermined temperature.

Preferably, the necessary heat quantity includes a warm-up heat quantity necessary for warming up the fuel cell.

Preferably, the controlling means increases the amount of the reaction gases supplied to the fuel cell when shifting from the first low-efficiency power generation mode or the second low-efficiency power generation mode to the high-efficiency power generation mode.

The invention further provides a method of controlling a fuel cell system including: a first step of obtaining a necessary heat quantity that is necessary for the fuel cell system, and a required output power required therefor; a second step of obtaining an operating point determined by a current value and a voltage value that satisfy the necessary heat quantity and the required output power in a current-voltage curve of a fuel cell determined by a supply condition of a reaction gas; and a third step of controlling the current value and the voltage value of the fuel cell so that electric power generation of the fuel cell is performed at the operating point.

Preferably, the fuel cell system includes a heating apparatus that uses generated heat by the fuel cell as a heat source; and the necessary heat quantity includes a heating heat quantity necessary for the heating apparatus that is being operated, and a warm-up heat quantity necessary for warming up the fuel cell.

Preferably, the required output power includes a driving force required by a vehicle incorporating the fuel cell system, and an output power required by an auxiliary machine of the fuel cell system.

Preferably, the fuel cell system has a converter for setting an operating point.

Advantage of the Invention

The invention enables supply of a necessary heat quantity that is necessary for the fuel cell system.

Moreover, the operating point of the fuel cell is controlled based on the necessary heat quantity that is necessary for the fuel cell system and the required output power required therefor. Therefore, it is possible to supply the necessary heat quantity while supplying the output power required for the fuel cell system.

DESCRIPTION OF REFERENCE NUMERALS AND SYMBOLS

10: fuel cell system, 100: fuel cell, 102: current sensor, 104: voltage sensor, 106: temperature sensor, 200: hydrogen system, 202: hydrogen gas tank, 204: pressure-reducing valve, 206: pressure sensor, 208: hydrogen supply passage, 210: hydrogen gas pump, 212: hydrogen gas circulation passage, 300: air system, 302: intake port, 304: air temperature sensor, 306: air pump, 308: pressure sensor, 310: pressure-regulating valve, 400: cooling system, 402, 412: temperature sensor, 404, 406: three-way valve, 408: radiator, 410: cooling medium pump, 414: cooling medium circulation passage, 416: heat exchange passage for heating, 418: heat exchanger, 420: radiator bypass passage, 422: heating apparatus, 500: load system, 502: inverter, 504: drive motor, 506: DC/DC converter, 508: secondary battery, 510: auxiliary machines, 512: voltage sensor, 514: capacitor, 600: control unit, 602: heating heat quantity, 604: heat quantity exchanged by heat exchanger, 606: warm-up heat quantity, 607: temperature-maintaining heat quantity, 608: I-V curve of high-efficiency power generation, 610: I-V curve of low-efficiency power generation.

BEST MODE FOR CARRYING OUT THE INVENTION

Hereinbelow, a first embodiment will be described with reference to FIGS. 1 to 7. The first embodiment is one in which a fuel cell system is applied to a fuel cell vehicle. The following embodiments are merely illustrative examples of ways of practicing the invention but are not to be construed as limitations to the invention.

Figure 1:
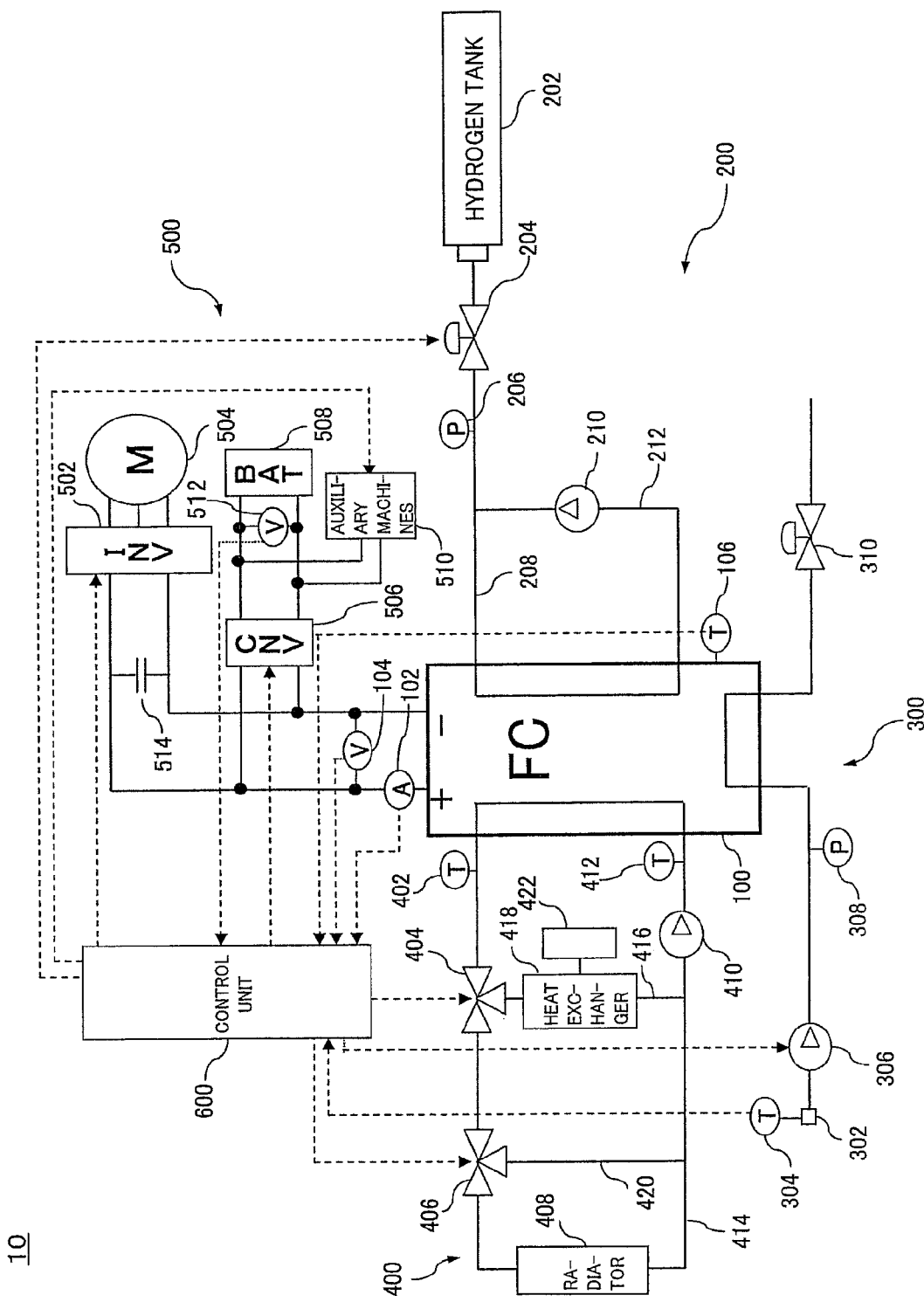
FIG. 1 is a diagram showing the configuration of a fuel cell system according to a first embodiment.

FIG. 1 shows a fuel cell system 10. The fuel cell system 10 of the first embodiment includes a fuel cell 100, a hydrogen system 200 that supplies a fuel gas to the fuel cell, an air system 300 that supplies an oxidizing gas to the fuel cell, a cooling system 400 for cooling the fuel cell, a load system 500 that utilizes the electric energy of the fuel cell, and a control unit 600 for controlling the fuel cell system.

A solid polymer electrolyte type fuel cell, for example, is used as the fuel cell 100. The first embodiment uses a fuel cell stack in which a plurality of unit cells are stacked. Electric power generation is performed by supplying a hydrogen gas serving as the fuel gas and air serving as the oxidizing gas. The fuel cell system also includes a current sensor 102 for detecting the current value of the fuel cell during electric power generation, a voltage sensor 104 for detecting the voltage between terminals of the fuel cell, and a temperature sensor 106 for measuring the temperature of the fuel cell. The detected values are input to the control unit 600.

The hydrogen system 200 that supplies a fuel gas to the fuel cell is a system including a passage of the hydrogen gas supplied from a hydrogen gas tank 202 containing hydrogen serving as the fuel gas to the fuel cell 100. The hydrogen gas supplied from the hydrogen gas tank 202 passes through a pressure-reducing valve 204 for reducing the pressure of the hydrogen gas to a predetermined pressure, a pressure sensor 206 for measuring the pressure of the hydrogen gas, and a hydrogen supply passage, 208 in that order. Then, the hydrogen gas is supplied to an anode-side hydrogen gas flow passage of the fuel cell 100. The detected pressure value of the hydrogen gas is input to the control unit 600. The control unit 600 controls the pressure-reducing valve 204 so that the pressure value of the hydrogen gas becomes a predetermined value.

This hydrogen gas is used for the electric power generation of the fuel cell 100. However, not the total amount of the supplied gas is consumed, and the unreacted hydrogen gas is discharged from the fuel cell 100. The discharged hydrogen gas usually has an increased content of water, which is a reaction product in the fuel cell. The discharged hydrogen gas passes through a hydrogen gas pump 210 for driving the hydrogen gas and a hydrogen gas circulation passage 212 that merges with the hydrogen supply passage 208, and merges with the hydrogen gas flowing in the hydrogen supply passage 208. This embodiment shows the hydrogen gas pump 210 serving as the driving force for circulating the hydrogen gas, but an ejector may serve as the driving source. That is, since the hydrogen gas from the hydrogen gas tank has a sufficient pressure, the circulating hydrogen gas can be accompanied by the flow of the hydrogen gas from the hydrogen gas tank by means of an ejector.

The air system 300 for supplying an oxidizing gas to the fuel cell is a passage for the oxidizing gas for supplying the air (particularly the oxygen present in the air) to the fuel cell and discharging it therefrom. The air sucked from an intake port 302 passes through a temperature sensor 304 for detecting the temperature of the air, an air pump 306 for compressing the air, and a pressure sensor 308 for detecting the pressure of the compressed air. Thereafter, the air is supplied to the cathode-side gas passage of the fuel cell 100. The detected air temperature and air pressure are input to the control unit 600. The air is used for the electric power generation of the fuel cell 100, and is thereafter discharged to the outside through a pressure-regulating valve 310. It should be noted that the air system for supplying the air to the fuel cell 100 may have a humidifier for humidifying the air.

The cooling system 400 for cooling the fuel cell is a passage for the cooling medium for dissipating the heat associated with the electric power generation of the fuel cell 100. In this embodiment, coolant is used as the cooling medium. The cooling medium discharged from the fuel cell 100 flows through a cooling medium circulation passage 414 that is equipped with a temperature sensor 402 for detecting the temperature of the cooling medium, a three-way valve 404 for controlling the flow rate of the cooling medium to a heat exchange passage 416 for heating, a three-way valve 406 for controlling the flow rate of the cooling medium to a radiator bypass passage 420, a radiator 408 for cooling the cooling medium, a cooling medium pump 410 for driving the circulation of the cooling medium, and a temperature sensor 412 for detecting the temperature of the cooling medium, in that order. Then, the cooling medium is again supplied to the fuel cell 100. The heat exchange passage 416 for heating is branched from the cooling medium circulation passage so as to bypass the radiator 408. The cooling medium in the heat exchange passage passes through a heat exchanger 418 using the heat source of the cooling medium heated by the fuel cell 100 as the heat source for heating, and thereafter merges with the cooling medium in the cooling medium circulation passage 414 again. The radiator bypass passage 420 is branched from the cooling medium circulation passage 414 so as to bypass the radiator 408, and thereafter merges with the cooling medium circulation passage 414 again. The three-way valve 404 of the heat exchange passage for heating and the three-way valve 406 of the radiator bypass passage are controlled by the control unit 600 so as to control the flow rate of the cooling medium. The detected temperature of the cooling medium is input to the control unit 600.

The heat exchanger 418 functions as the heat source of the heating apparatus 422. The heating apparatus 422 has a heating temperature manipulating unit that can set the heating temperature as desired or automatically. Preferably, the heating apparatus 422 has a temperature sensor for detecting the temperature in the vehicle cabin that is the subject of heating. The detected temperature in the vehicle cabin is input to the control unit 600.

The load system 500 that utilizes the electric energy of the fuel cell is configured so that a drive motor inverter 502 for converting direct current to alternating current, and a drive motor 504 for driving the automobile are connected to the fuel cell 100. The inverter 502 has a three-phase bridge circuit, for example, composed of six transistors, and converts direct current into alternating current by the switching operations of the transistors. The inverter 502 controls alternating current in response to the request from the control unit 600, so as to control the output torque and the number of revolutions of the drive motor 504. A capacitor 514 is provided in order to absorb excessive output power from the fuel cell.

Further, the load system 500 of the fuel cell has a DC/DC converter 506, a secondary battery 508, and auxiliary machines 510 so as to be in parallel with the drive motor's inverter 502 and the drive motor 504. The secondary battery 508 has a voltage sensor 512 for measuring the voltage of the secondary battery 508. The DC/DC converter 506 has the function to control the voltage value during the electric power generation of the fuel cell 100, and the function to control the voltage of the fuel cell 100 to a voltage for the secondary battery 508 so as to charge the secondary battery 508. Examples of the secondary battery 508 include a lead-acid battery, a nickel-hydride storage battery, and a lithium ion battery.

The auxiliary machines 510 are connected to the secondary battery 508. They function by consuming the electric power supplied from the secondary battery 508. The auxiliary machines 510 in this embodiment include the hydrogen gas pump 210, the air pump 306, the cooling medium pump 410, and the humidifier, and electric power is supplied from the secondary battery 508 to these auxiliary machines.

The control unit 600 for controlling the fuel cell system is one which controls the fuel cell system 10 according to the necessary heat quantity that is necessary for the fuel cell system 10 and the required output power required therefor. Examples of the necessary heat quantity include the heating heat quantity that the heating apparatus 422 requires as the heat source, and the heat quantity necessary for warming up the fuel cell 100 to an optimum electric power generation temperature (hereinafter referred to as a "warm-up heat quantity"). Examples of the required output power include the output power required by the drive motor 504 of the load system, and the required output power required by the auxiliary machines 510.

Figure 2:
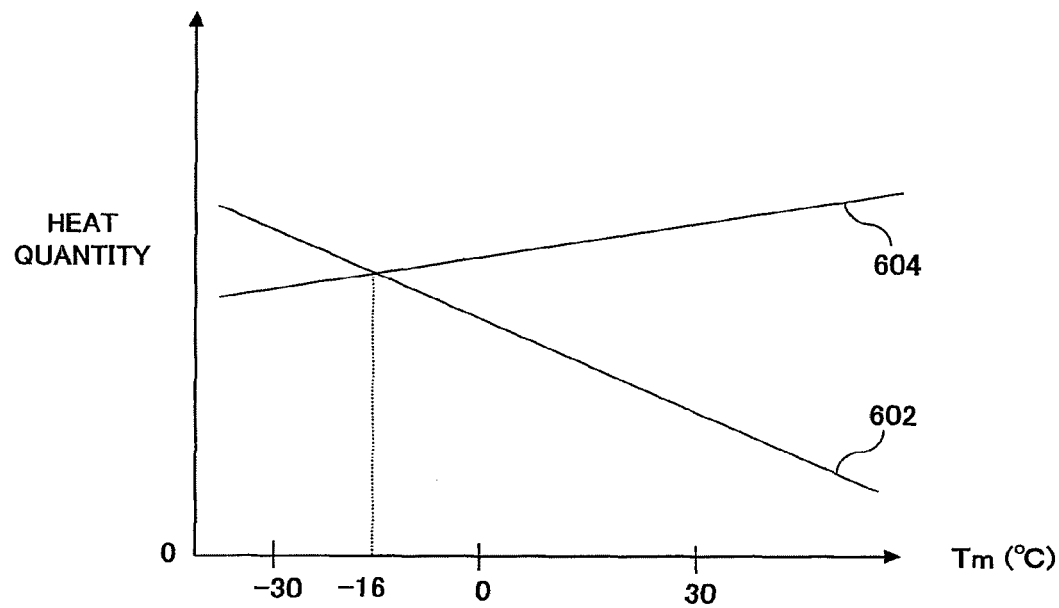
FIG. 2 is a graph showing a map of a heating heat quantity and a heat quantity exchanged by a heat exchanger.

The necessary heat quantity is calculated by the control unit 600. The heating heat quantity is calculated by reference to a heating heat quantity map prepared in advance from the air temperature of the outside air. The heating heat quantity map is produced taking into consideration a vehicle cabin thermal insulation coefficient, which is determined by the capacity of the interior of the vehicle cabin, the presence or absence of heat insulating material, and the like. The map is prepared also taking into consideration the setting temperature of the heating apparatus 422 and the temperature of the interior of the vehicle cabin. FIG. 2 shows a map of the heating heat quantity 602 and a heat quantity 604 exchanged by the heat exchanger based on the air temperature of the outside air under predetermined conditions. In the map of FIG. 2, the required heating quantity 602 is greater than the heat quantity 604 exchanged by the heat exchanger in the temperature region below −16° C., for example. In this region, the heat quantity supplied to the heating apparatus 422 is limited by the heat quantity exchanged by the heat exchanger 418. As a consequence, a sufficient heat quantity cannot be supplied to the heating apparatus in a region in which the temperature is equal to or lower than −16° C. In view of this, it is preferable that the fuel cell 100 be caused to perform later-described low-efficiency power generation so as to increase the heat generation quantity, whereby the deficient heat quantity can be steadily supplied in the temperature region equal to or lower than −16° C.

Figure 3:
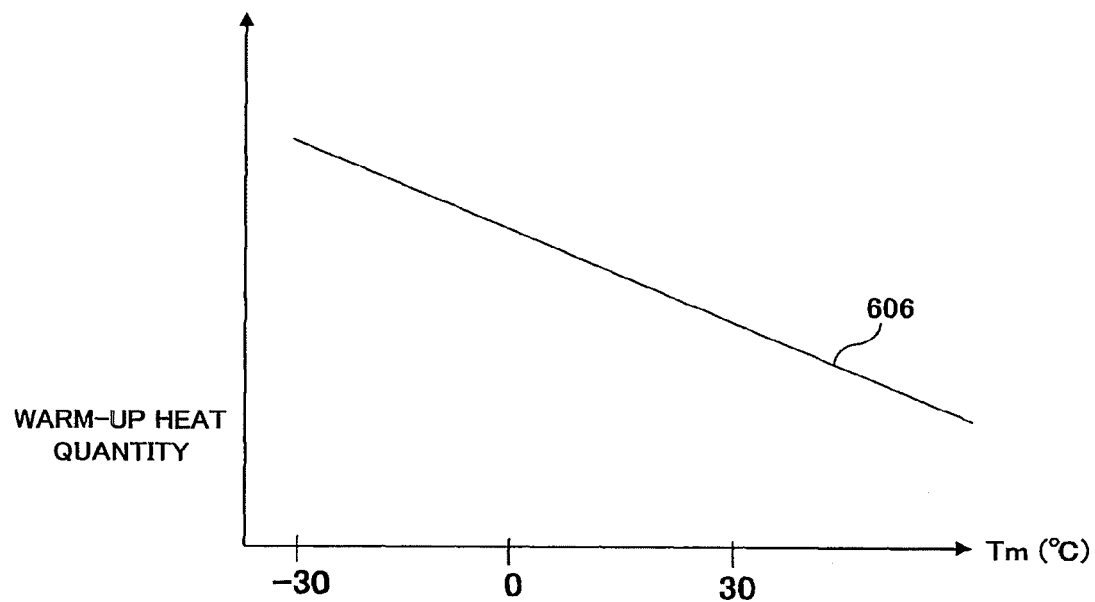
FIG. 3 is a graph showing a map of a warm-up heat quantity.

The warm-up heat quantity is calculated by reference to a warm-up heat quantity map obtained in advance based on the outside air temperature. FIG. 3 shows a map of a warm-up heat quantity 606 based on the outside air temperature under predetermined conditions. Preferably, the warm-up heat quantity is prepared taking into consideration the temperature of the fuel cell 100 and the temperature of the cooling medium, in addition to the outside air temperature.

Figure 4:
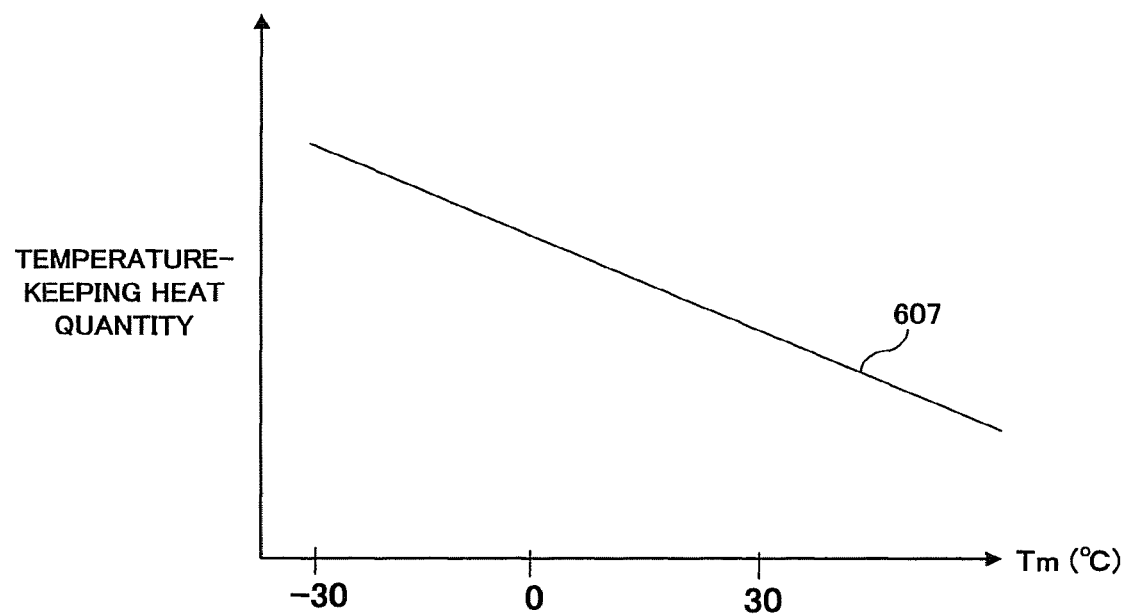
FIG. 4 is a graph showing a map of a temperature-maintaining heat quantity for maintaining the fuel cell at a certain temperature.

After a warm-up operation, the fuel cell 100 reaches a predetermined temperature (in the vicinity of 80 degrees). Since the temperature of the fuel cell 100 after the warm-up (in the vicinity of 80 degrees) is a temperature higher than the outside air temperature, the heat quantity retained by the fuel cell itself is dissipated. Especially under a subfreezing condition, the heat dissipation quantity from the fuel cell 100 becomes greater than the heat generation quantity in normal electric power generation, and the fuel cell may fail to be maintained at a predetermined temperature. For this reason, the necessary heat quantity for the fuel cell after the warming up must include a temperature-maintaining heat quantity that is necessary for maintaining the fuel cell system 10 at a predetermined temperature. FIG. 4 shows a map of a temperature-maintaining heat quantity 607 of the fuel cell at a predetermined temperature. The temperature-maintaining heat quantity map of FIG. 4 is created as the product of the heat dissipation coefficient of the fuel cell system at a predetermined temperature and the difference between the temperature of the fuel cell 100 and the outside air temperature. By causing the fuel cell to generate heat while taking the temperature-maintaining heat quantity 607 into consideration, it is possible to prevent the fuel cell temperature from lowering relative to the predetermined temperature and prevent the fuel cell system 10 from freezing.

The control unit 600 controls the three way-valves 404 and 406 in the cooling medium circulation passage 414. In the case where heating is necessary, the three-way valve 404 is controlled so that the cooling medium can circulate through the heat exchange passage 416 for heating. On the other hand, in the case where heating is unnecessary, the three-way valve 404 is closed so that the cooling medium cannot circulate through the heat exchange passage for heating. In the case where the cooling medium has not yet warmed up, the three-way valve 406 is controlled so that the cooling medium can bypass the radiator 408 so as not to be cooled. On the other hand, in the case where the temperature of the cooling medium becomes high, the three-way valve 406 is controlled so that the cooling medium passes through the radiator 408.

The required output power is calculated by the control unit 600. The output power requirement of the drive motor 504 is calculated, for example, from the requirement from an accelerator pedal and the vehicle speed detected by a vehicle speed sensor. The output power requirement in the auxiliary machines 510 is calculated by adding up the respective output powers necessary for driving the hydrogen gas pump 210, the air pump 306, and the cooling medium pump 410.

In addition, the control unit 600 controls the voltage value of the fuel cell 100 by the DC/DC converter 506. In this embodiment, in order to control the voltage value of the fuel cell 100, duty control of the DC/DC converter 506 is performed based on the voltage value of the fuel cell 100 detected by the voltage sensor 104 and the voltage value of the secondary battery 508 detected by the voltage sensor 512.

Figure 5:
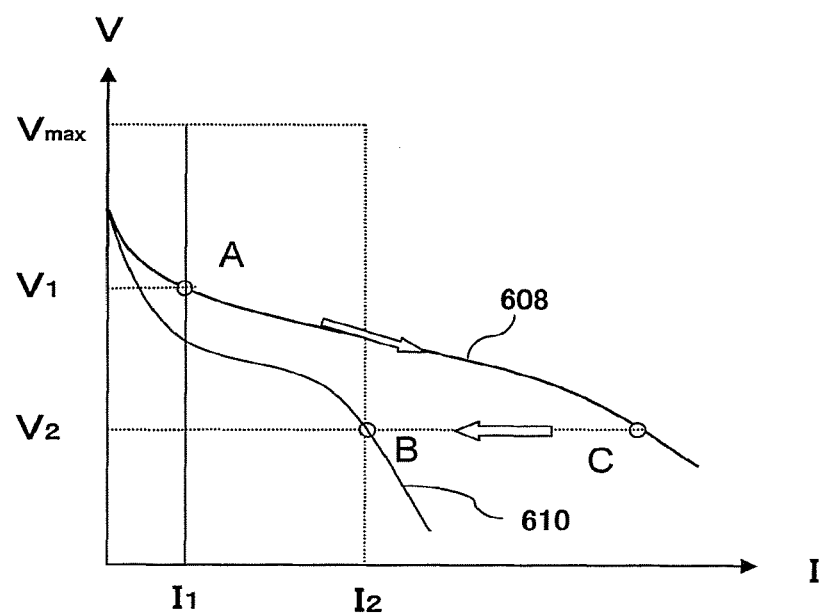
FIG. 5 is a graph showing the I-V characteristics of the fuel cell.

The heat generation and output power associated with high-efficiency power generation of the fuel cell 100 will be described with reference to FIG. 5. FIG. 5 shows a current-voltage curve 608 (hereinafter "I-V curve") of the fuel cell in the high-efficiency power generation, which has been obtained empirically, and an operating point A on the I-V curve. The high-efficiency power generation of a fuel cell is a condition in which the operating point of the fuel cell is on the I-V curve 608, which indicates the optimum power generation efficiency of the while fuel cell system 10 including the fuel cell 100, the auxiliary machines 510, and so forth. The optimum power generation efficiency refers to the maximum value or maximal value of power generation efficiency, or the power generation efficiency in the vicinity thereof. At the operating point A, the current value is I1 and the voltage value is V1. The power generation efficiency of the fuel cell is a ratio of the output power of the fuel cell to the hydrogen energy fed to the fuel cell. The hydrogen energy that is fed is the product of the current value I1 and the electromotive force Vmax of the fuel cell. The electromotive force Vmax of the fuel cell is calculated in the following manner. For example, in the case where the fuel cell is composed of 400 unit cell stacks and the electromotive force of each unit cell is 1.23 V, the electromotive force of the fuel cell is obtained as 492 V, by multiplying the two.

The output power of the fuel cell is a product ($I1 \times V1$) of the current value I1 and the voltage value V1. The heat generation quantity by the fuel cell is the energy obtained by subtracting the output power of the fuel cell from the hydrogen energy that is fed thereto ($I1 \times Vmax - I1 \times V1$). It should be noted that the voltage value in high-efficiency power generation is controlled within a range of 50% to 70% of the electromotive force of the fuel cell.

In order to increase the heat generation quantity of the fuel cell 100, the operating point is controlled from the operating point A on the I-V curve 608 of the high-efficiency power generation to an operating point B, at which the voltage is low, a voltage value V2, and the current is high, a current value I2. Thereby, the fuel cell is put under a state of the low-efficiency power generation, in which power generation efficiency is lower than that of the high-efficiency power generation, and the heat generation quantity at the operating point B increases, $I2 \times Vmax - I2 \times V2$, from the heat generation quantity of the operating point A.

In order to control the fuel cell at the operating point B, the voltage value is controlled to V2 by the DC/DC converter 506, and an operating point C is set on the I-V curve 608 of the high-efficiency power generation. Next, the air supply amount to the fuel cell is reduced by the air pump 306 so that the current value is controlled to I2. Here, when the air supply amount to the fuel cell 100 is reduced, an I-V curve 610 is formed, in which the power generation efficiency is lower than that of the I-V curve 608 of the high-efficiency power generation. As the air supply amount reduces, the oxygen supply amount to the cathode and the discharge amount of the water generated accordingly decrease. Thus, the reaction in the cathode is inhibited, and the current value decreases at a predetermined voltage value. It should be noted that in the embodiment voltage is controlled by the DC/DC converter earlier, but it is also possible to change the I-V curve earlier by controlling the air supply amount by the air pump 306.

In the case where the heat generation quantity of the fuel cell 100 should be increased while the vehicle is running, it is desirable that the output power be ensured by controlling the fuel cell to a somewhat high voltage value V2, in order to satisfy the output power requirement of the drive motor 504 and so forth. Preferably, the voltage value is controlled within a range of the voltage value determined by the output torque requirement of the drive motor (e.g., 120 V) to 50% of the electromotive force of the fuel cell. Here, the low-efficiency power generation in which the voltage value determined by the output torque requirement of the drive motor is defined as a first lower limit voltage value and the first lower limit voltage value is set to the lower limit of the voltage value is defined as a first low-efficiency power generation mode. In the first low-efficiency power generation, the voltage of the fuel cell is controlled so as to be equal to or higher than the first lower limit voltage value by the DC/DC converter 506 according to the required output power and the necessary heat quantity, and the current value is controlled by changing the air supply amount to the fuel cell.

In the case where the heat generation quantity of the fuel cell 100 is to be increased greatly while the vehicle is at a standstill, such as at starting under a subfreezing temperature, there is no required output power of the drive motor 504, and only the output power that can drive the auxiliary machines 510 needs to be supplied. Therefore, a greater heat generation quantity can be supplied by low-voltage low-efficiency power generation in which the target voltage value is set lower than the voltage value V2 that is fixed at a predetermined value. It is desirable that the voltage value of the fuel cell 100 be controlled within a range from a voltage value determined by the control bound of the DC/DC converter (e.g., 15 V) to a voltage value determined by the output torque requirement of the drive motor 504 (e.g., 120 V). Here, the voltage value determined by the control bound by the DC/DC converter is defined as a second lower limit voltage value. It should be noted that in the case where there is no output torque requirement of the drive motor even while the vehicle is running, the heat generation quantity can be increased by setting the lower limit voltage value to the second lower limit voltage value. The low-efficiency power generation in which the second lower limit voltage value is set to the lower limit voltage value is defined as a second low-efficiency power generation mode.

Figure 6:
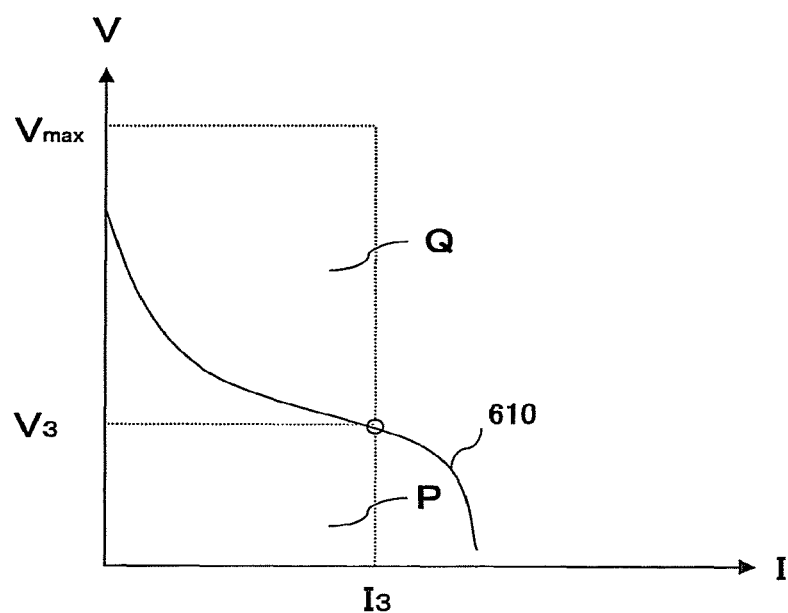
FIG. 6 is a graph for obtaining an operating point of the fuel cell based on the necessary heat quantity and the required output power.

Next, the relationship between the output power and the heat generation quantity of the fuel cell 100 in the low-efficiency power generation according to this embodiment will be described with reference to FIG. 6. The current value I3 and the voltage value V3 at an operating point D are obtained based on the necessary heat quantity Q [W] and the required output power P [W] obtained by the control unit 600. Specifically, the hydrogen energy consumed by the fuel cell is $I3 \times Vmax = Q + P$. Thus, $I3 = (Q+P)/Vmax$, and $V3 = (Vmax \times P)/(Q+P)$ are obtained. By controlling the fuel cell to the obtained operating point (current value I3 and current value V3), the necessary heat quantity P and the required output power Q can be satisfied at the same time. In the operating point control based on the just-described calculation, the necessary heat quantity Q and the required output power P satisfy the respective relations, $Q=(Vmax-V) \times I$ and $P = I \times V$.

Figure 7:
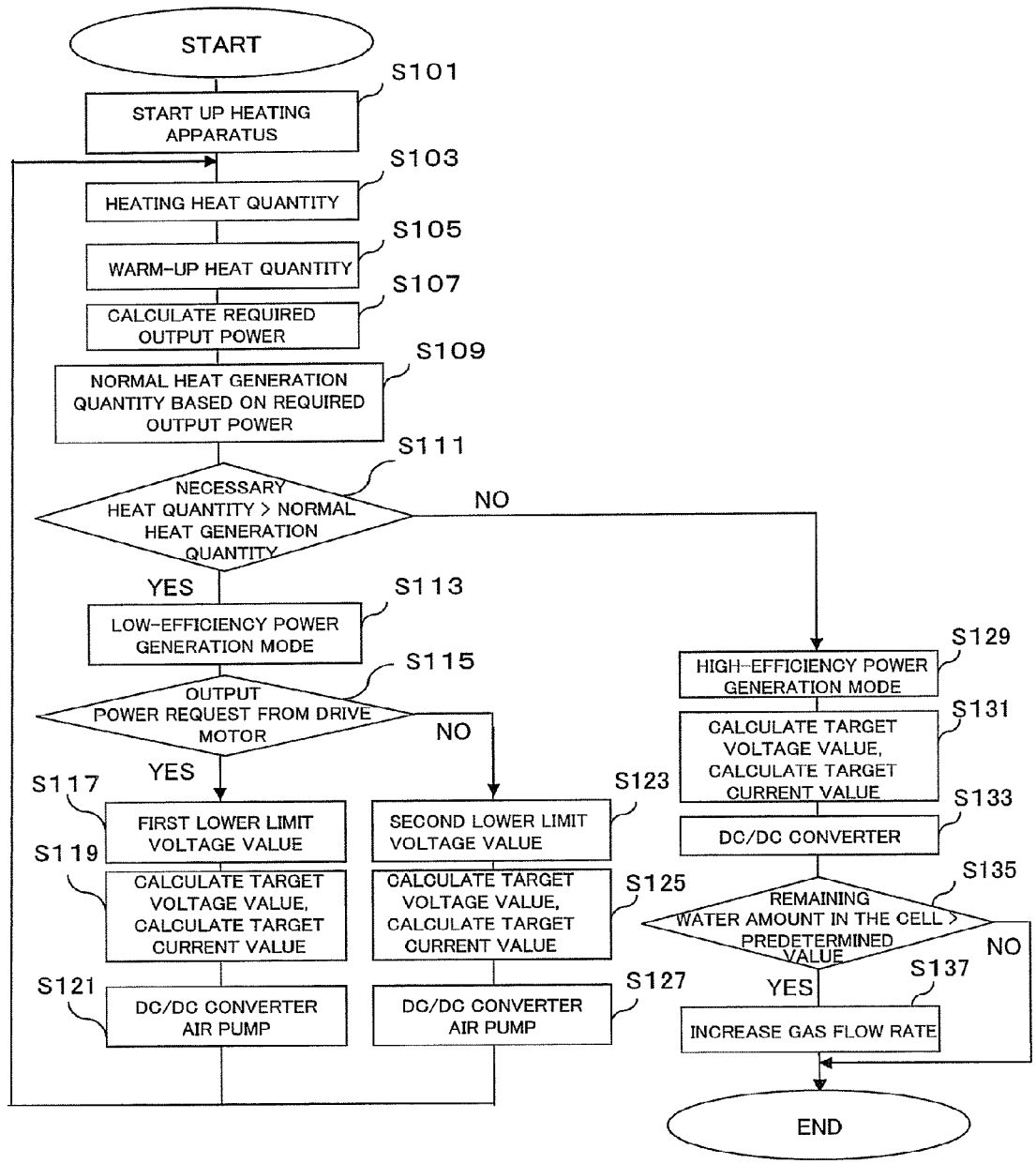
FIG. 7 is a flowchart pertaining to the first embodiment.

Next, one example of the operation control of the fuel cell in the first embodiment will be described with reference to FIG. 7. It should be noted that the control shown in FIG. 7 is computed sequentially every certain time interval.

The heating apparatus of the fuel cell system 10 is working, and the heat generation quantity of the fuel cell 100 is used as the heat source for the heating apparatus (step S101). At this time, the temperature setting of heating is input by the heating temperature manipulating unit. The heating heat quantity is calculated using a map (step S103). The warm-up heat quantity of the fuel cell is calculated (step S105). Here, the total value of the heating heat quantity and the warm-up heat quantity constitutes the necessary heat quantity (Qa). It should be noted that when the system has reached a predetermined temperature, calculation of the temperature-maintaining heat quantity is performed in place of step S105.

Next, the required output power of the total value of the output power requirement of the drive motor and the output power requirement of the auxiliary machines of the fuel cell system 10 is calculated by the control unit 600 (step S107).

The output power of the calculated required output power can be supplied, and also, the operating point of the fuel cell on the I-V curve in the high-efficiency power generation can be obtained. The heat generation quantity by the fuel cell at this operating point (normal heat generation quantity, Qb) is calculated (step S109).

A determination is made as to whether the necessary heat quantity (Qa) calculated is greater than the normal heat generation quantity (Qb) (step S111). If the determination result shows that the necessary heat quantity (Qa) is greater than the normal heat generation quantity (Qb) (step S111: YES), the fuel cell 100 enters a state of low-efficiency power generation (step S113). Next, a determination is made as to whether the drive motor has issued a request for output power (step S115). If it is determined that the drive motor has requested output power (step S115: YES), the first low-efficiency power generation mode is entered, in which the lower limit value of the voltage is permitted to be as low as the first lower limit voltage value (step S117). The target current value determines a target voltage value that is within a permitted voltage range and that satisfies the necessary heat quantity and the required output power (step S119). The duty ratio of the DC/DC converter is controlled so that the voltage of the fuel cell 100 becomes the target voltage value (step S121). In addition, the air supply amount is controlled by the air pump so that the current of the fuel cell 100 becomes the target current value (step S121).

If it is determined that the drive motor has not requested output power (step S115: NO), the second low-efficiency power generation mode is entered, in which the lower limit value of the voltage is permitted to be as low as the second lower limit voltage value (step S123). The target current value determines a target voltage value that is within a permitted voltage range and that satisfies the necessary heat quantity and the required output power (step S125). The duty ratio of the DC/DC converter is controlled so that the voltage of the fuel cell 100 becomes the target voltage value (step S127). In addition, the air supply amount is controlled by the air pump so that the current of the fuel cell 100 becomes the target current value (step S127).

After a certain amount of time has elapsed at step 121 or step 127, the process returns to step S103. It should be noted that, in the determination at step S111, it is preferable to make determination when the criterion Qa>Qb has been satisfied for a certain length of time.

If it is determined that the necessary heat quantity (Qa) is less than the normal heat generation quantity (Qb) (step S111: NO), the fuel cell 100 enters a state of high-efficiency power generation (step S129). In this state, there are calculated the target voltage value and the target current value that result in the operating point of the fuel cell being on the I-V curve for the high-efficiency power generation, at which the output power of the required output power can be supplied (step S131). Once a voltage value is determined, the current value is automatically determined at the same time on the I-V curve in the high-efficiency power generation; therefore, only the voltage value should be controlled by performing duty control of the DC/DC converter (step S133). By the high-efficiency power generation, the fuel cell system 10 can generate electric power at high efficiency while the heat generation quantity of the necessary heat quantity is supplied.

On the other hand, when the fuel cell 100 is operated at the low-efficiency power generation, there is a problem that, since the air supply amount is small, the water that has been generated in association with electric power generation cannot be drained away from the interior of the fuel cell and the water remains therein. Accordingly, in this embodiment, a determination is made as to whether the remaining water amount in the cell is greater than a predetermined value after the power generation state is shifted from the low-efficiency power generation mode to the high-efficiency power generation mode (step S135). The remaining water amount in the cell may be estimated from the current value of the fuel cell and the supplied air amount, or may be estimated from the resistance value of a solid polymer membrane that constitutes the fuel cell. Here, if it is determined that the remaining water amount in the cell is greater than a predetermined value (step S135: YES), the water content remaining in the gas passage within the cell is drained by increasing the reaction gas flow rate (step S137). The air supply amount is increased by the air pump in the cathode side gas passage of the fuel cell. Thereby, water is drained. It should be noted that drainage of the water remaining in the anode-side gas passage of the fuel cell may be carried out by driving the hydrogen gas pump in the hydrogen circulation passage to increase the supply amount of the gas. After increasing the gas flow rate for a predetermined duration, the control of this embodiment is terminated. Here, the I-V curve of the high-efficiency power generation shows the most efficient curve, showing a state in which the power generation efficiency is saturated with respect to the air supply amount. Therefore, even when the air supply amount is increased during the high-efficiency power generation, the profile of the I-V curve does not change. The operating point of the fuel cell does not change so long as the voltage value is controlled to be constant by the DC/DC converter. Therefore, the output power of the fuel cell is constant, and the problem that excessive output power is supplied does not arise.

On the other hand, if it is determined that the remaining water amount in the cell is less than the predetermined value (step S135: NO), the control of this embodiment is terminated.

Figure 8:
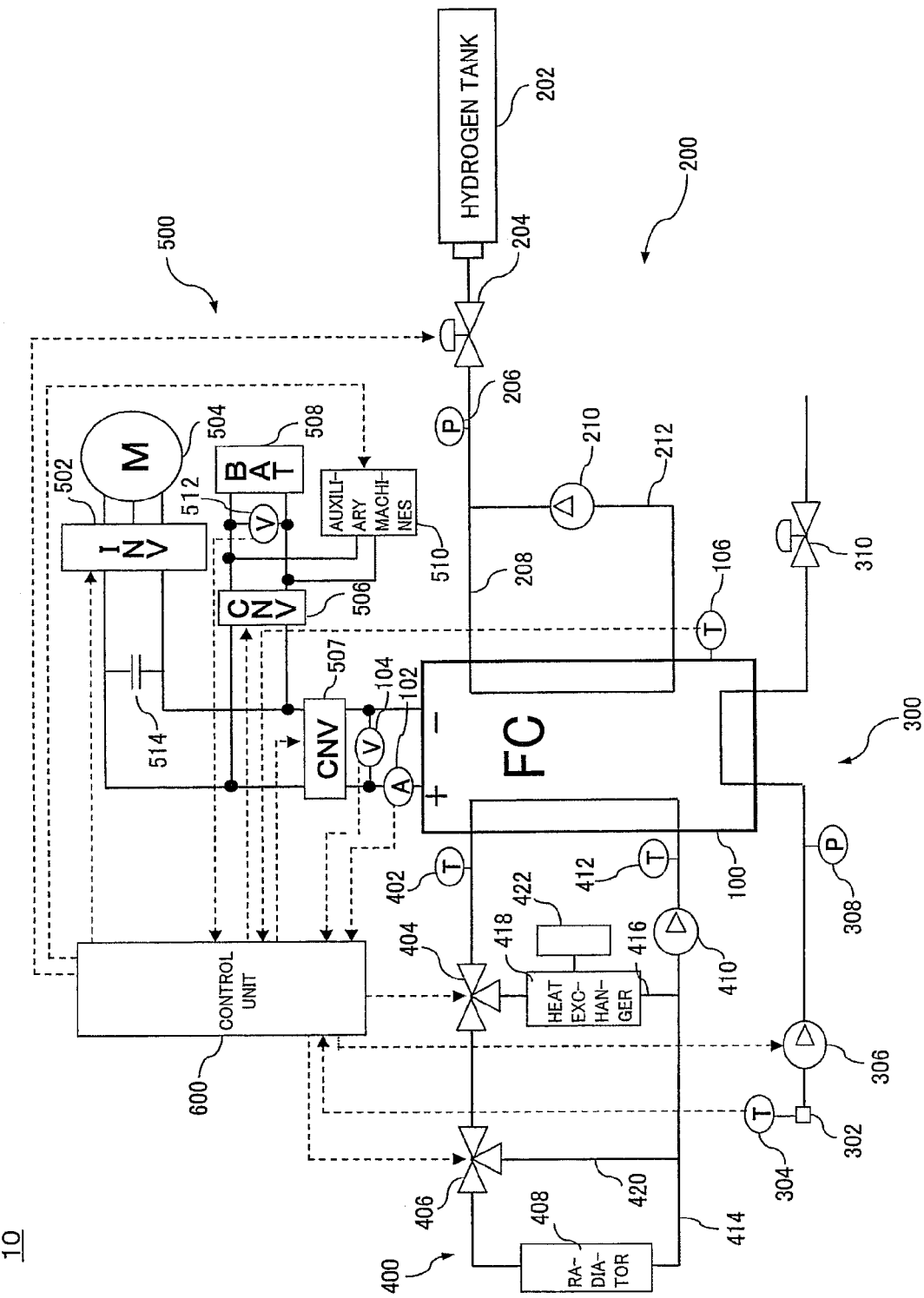
FIG. 8 is a diagram showing the configuration of a fuel cell system according to a second embodiment.
Figure 9:
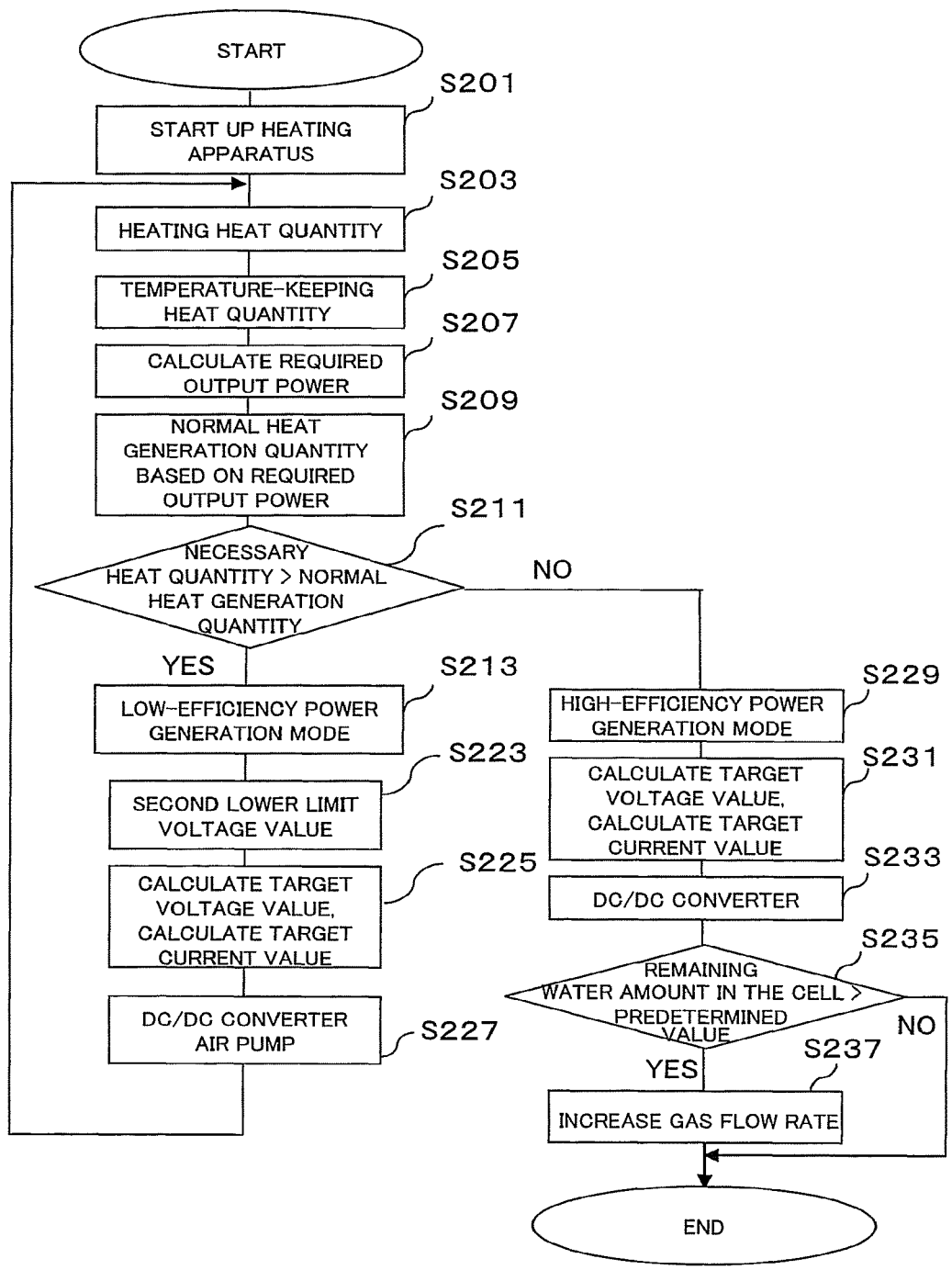
FIG. 9 is a flowchart pertaining to the second embodiment.

Next, a second embodiment will be described with reference to FIGS. 8 and 9. FIG. 8 shows a system configuration diagram of the second embodiment. The system configuration of the second embodiment is a configuration in which, in the first embodiment and the fuel cell load system 500, a DC/DC converter 507 is further provided at the output end of the fuel cell 100. That is, in the load system 500 of the fuel cell system, the fuel cell 100 is connected in series to the DC/DC converter 507, the drive motor inverter 502 and the drive motor 504, and the DC/DC converter 506, the secondary battery 508, and the auxiliary machines 510 are provided in parallel to the drive motor inverter 502 and the drive motor 504. The configuration in which the DC/DC converter 506 is provided at the output end of the fuel cell 100 makes it possible to operate the drive motor 504 even when the voltage of the fuel cell is lower than the first lower limit voltage value, by elevating the voltage of the fuel cell. This enables the voltage of the fuel cell 100 to lower to the second lower limit voltage value determined by the control bound of the DC/DC converter 507.

Next, an example of the operation control of the fuel cell according to the second embodiment will be described with reference to FIG. 9. The operation control of the second embodiment discusses a control in which, in the case where the fuel cell system 10 is at a predetermined temperature, the temperature-maintaining heat quantity 607 that is necessary for maintaining the temperature of the fuel cell system is included in the necessary heat quantity for the fuel cell system 10.

The heating heat quantity necessary for the heating apparatus that is operating (step S201) is calculated using a map (step S203). The temperature-maintaining heat quantity necessary for maintaining the temperature of the fuel cell system is calculated using a map (step S205). Here, the total value of the heating heat quantity and the temperature-maintaining heat quantity constitutes the necessary heat quantity (Qa).

Next, the required output power of the total value of the output power requirement of the drive motor 504 and the output power requirement of the auxiliary machines of the fuel cell system 10 is calculated by the control unit 600 (step S207). The heat generation quantity of the fuel cell at the operating point that meets the required output power (normal heat generation amount, Qb) is calculated (step S209).

A determination is made as to whether the necessary heat quantity (Qa) calculated is greater than the normal heat generation quantity (Qb) (step S211). If the result of determination shows that the necessary heat quantity (Qa) is greater than the normal heat generation quantity (Qb) (step S211: YES), the fuel cell 100 enters a state of low-efficiency power generation (step S213). When the low-efficiency power generation is entered (step S213) in this embodiment, the second low-efficiency power generation mode is entered in which the lower limit value the voltage is permitted to be as low as the second lower limit voltage value, irrespective of the presence or absence of the output torque requirement of the drive motor (step S223). The target current value and the target voltage value that are within a permitted voltage range and that satisfy the heat generation requirement and the output power requirement are determined (step S225). The duty ratio of the DC/DC converter is controlled so that the voltage of the fuel cell becomes the target voltage value, and the air supply amount is controlled by the air pump so that the current value becomes the target current value (step S227).

If the result of determination shows that the necessary heat quantity (Qa) is less than the normal heat generation quantity (Qb) (step S211: NO), the high-efficiency power generation is performed (step S229). The control flow after step S231 is the same as the flow after step S131 in the first embodiment.

In this embodiment, the necessary heat quantity of the fuel cell system is supplied by the heat generated by the fuel cell. However, it is also suitable to additionally provide a heating means for the fuel cell system and to supply to the fuel cell a heat quantity excluding the heating amount resulting from the heating means from the necessary heat quantity.

Moreover, in this embodiment, drainage of the water accumulated in the low-efficiency power generation mode is carried out after shifting to the high-efficiency power generation mode. However, it is also suitable to carry out the drainage when shifting from the low-efficiency power generation mode to the high-efficiency power generation mode. This may be achieved by forcibly increasing the reaction gas flow rate when shifting from the low-efficiency power generation mode to the high-efficiency power generation mode. In addition, the remaining water amount in the cell may be estimated from the duration of the low-efficiency power generation mode. Furthermore, the amount of the reaction gas for the drainage may be set so that when the remaining water amount in the cell is greater, the amount of the reaction gas is accordingly greater.

The invention claimed is:

1. A fuel cell system comprising:
   a fuel cell that generates electric power using a fuel gas and an oxidizing gas as reaction gases; and
   a control unit configured to:
      control a current of the fuel cell so that the current becomes a target current value;
      control a voltage of the fuel cell so that the voltage becomes a target voltage value; and
      control a heat generation quantity, by:
         calculating a necessary heat quantity that is necessary for the fuel cell system at that point and a required output power of at least one of a motor or auxiliary machine of the fuel cell system at that point, and
         determining the target current value and a target voltage so as to generate heat in the necessary required heat quantity and output power in the required output power.

2. The fuel cell system as set forth in claim 1, further comprising:
   a heating apparatus using the heat generated by the fuel cell as a heat source; and wherein
   the necessary heat quantity includes a heating heat quantity necessary for the heating apparatus that is operating.

3. The fuel cell system as set forth in claim 1, wherein the necessary heat quantity includes a warm-up heat quantity necessary for warming up the fuel cell.

4. The fuel cell system as set forth in claim 1, wherein the necessary heat quantity includes a temperature-maintaining heat quantity necessary for maintaining the temperature of the fuel cell system at a predetermined temperature.

5. The fuel cell system as set forth in claim 1, wherein the control unit performs control with low-efficiency power generation in which power generation efficiency is lower than that in high-efficiency power generation of the fuel cell.

6. The fuel cell system as set forth in claim 1, wherein the control unit includes a voltage controlling section including DC/DC converter and a current controlling section including a reaction gas supplying section.

7. The fuel cell system as set forth in claim 1, wherein the control unit determines that the target current value=(Q+P)/Vmax, and the target voltage value=(Vmax*P)/(Q+P), where P is required output power for the fuel cell, Q is the necessary heat quantity, and Vmax is an electromotive force as a theoretical output voltage of the fuel cell.

* * * * *